(12) United States Patent
Tamai et al.

(10) Patent No.: US 8,550,587 B2
(45) Date of Patent: Oct. 8, 2013

(54) LIQUID EJECTING APPARATUS AND LIQUID EJECTING METHOD

(75) Inventors: Takashi Tamai, Shiojiri (JP); Takeshi Tanoue, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 13/048,293

(22) Filed: Mar. 15, 2011

(65) Prior Publication Data

US 2011/0221814 A1    Sep. 15, 2011

(30) Foreign Application Priority Data

Mar. 15, 2010 (JP) ................. 2010-057128

(51) Int. Cl.
*B41J 29/38* (2006.01)
*B41J 2/25* (2006.01)
*B41J 2/21* (2006.01)

(52) U.S. Cl.
USPC ................. 347/14; 347/15; 347/43

(58) Field of Classification Search
USPC ................. 347/14–15, 19, 43–44
See application file for complete search history.

(56) References Cited

U.S. PATENT DOCUMENTS 5,754,198 A     5/1998 Nishikawa
2008/0246793 A1* 10/2008 Seki et al. .............. 347/15

FOREIGN PATENT DOCUMENTS

JP           08156286 A      6/1996

* cited by examiner

*Primary Examiner* — Jason Uhlenhake
(74) *Attorney, Agent, or Firm* — Nutter McClennen & Fish LLP; John J. Penny, Jr.; Christina M. Sperry

(57) ABSTRACT

Two types of decimating mask patterns having different ink gradation ratio distributions are prepared, and in the outbound and inbound passes of a head unit during bidirectional printing, the numbers of times ink is ejected from nozzle rows in recording heads provided for each ink are controlled using mask patterns that differ in accordance with the darkness of the ink.

7 Claims, 4 Drawing Sheets

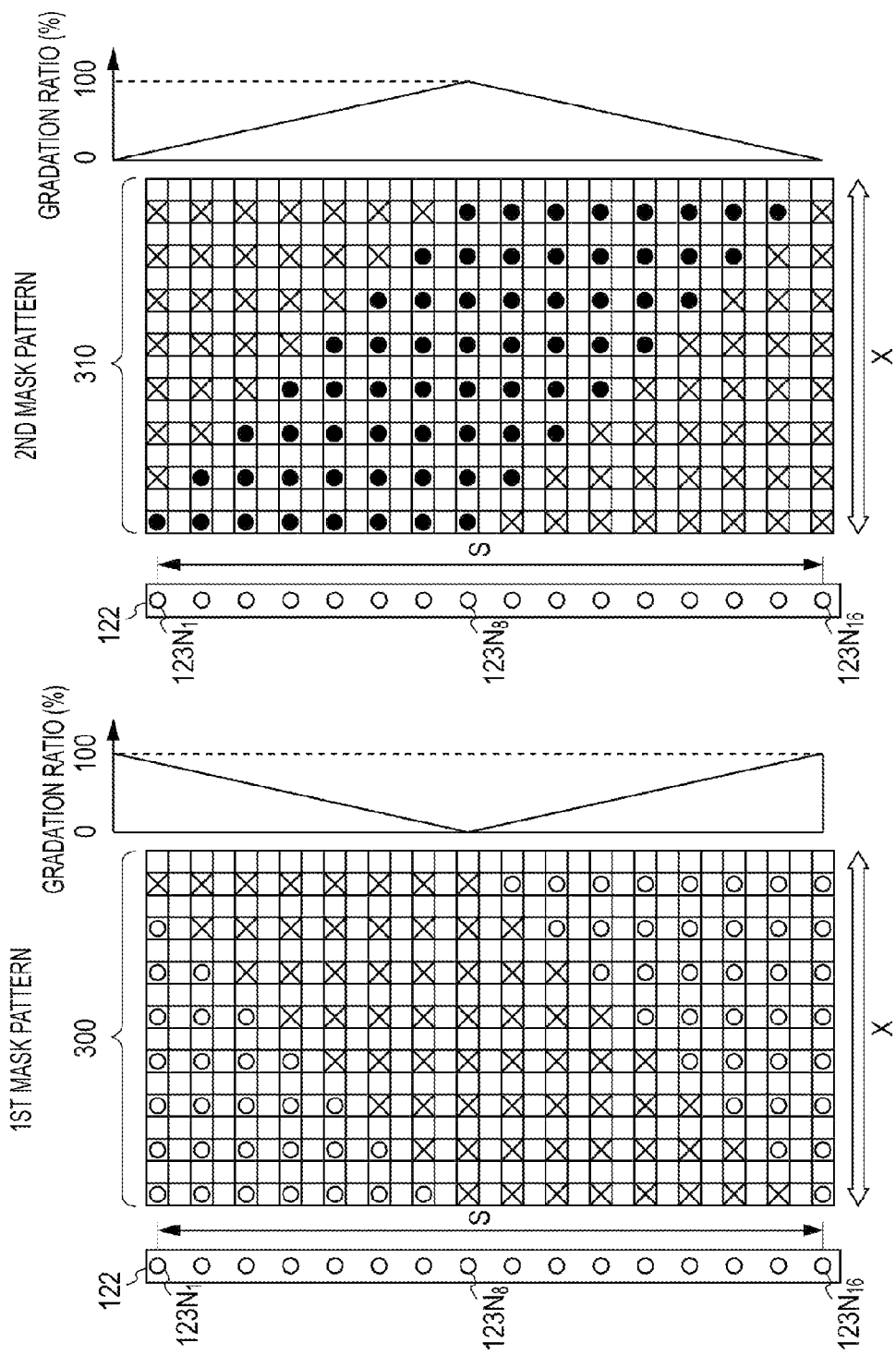

LIQUID EJECTING APPARATUS AND LIQUID EJECTING METHOD

BACKGROUND

1. Technical Field

The present invention relates to liquid ejecting apparatuses that selectively eject multiple types of liquid onto a print medium from a head that moves back and forth in the main scanning direction, and particularly relates to techniques for preventing the occurrence of darkness unevenness caused by changes in the order in which liquids are superimposed upon the print medium in the inbound and outbound passes of the head.

2. Related Art

The ink jet printer disclosed in, for example, JP-A-8-156286 is known as a color ink jet printer that prevents the occurrence of darkness unevenness resulting from inverting the order in which inks are superimposed upon recording paper in the outbound and inbound passes of a recording head during bidirectional recording.

In this ink jet printer, a multi-nozzle ink jet print head for each of its multiple colors, which has a scanning width W, is supported on a carriage using a step-shaped support platform so that the multi-nozzle ink jet print head for each of its multiple colors is disposed being skewed relative to each other by a predetermined pitch P (W<P<2W) in the sub scanning direction. Through such a configuration, the borders of the band regions scanned by the multi-nozzle ink jet print head for each of its multiple colors do not overlap and the multiple colors in the multi-nozzle ink jet print head for each of its multiple colors always scan on recording paper in the same order both when the carriage is outbound and when the carriage is inbound; as a result, the appearance of banding caused by recording paper feed errors and so on can be reduced, and the occurrence of banding caused by inverting the order in which the ink is superimposed upon the recording paper when the carriage is outbound and when the carriage is inbound can be prevented.

However, in the stated past ink jet printer, it is necessary to dispose the multi-nozzle ink jet print head for each of its multiple colors, which has a scanning width W, being skewed from each other by the predetermined pitch P (W<P<2W) in the sub scanning direction. Accordingly, the size of the recording head is greater compared to, for example, the case where the multiple colors in the multi-nozzle ink jet heads for each of its multiple colors are arranged in a row in the main scanning direction.

Furthermore, it is necessary to provide a separate support platform for disposing the multi-nozzle ink jet print head for each of its multiple colors according to the aforementioned positional relationships, which increases the cost.

SUMMARY

An advantage of some aspects of the invention is to suppress, in a liquid ejecting apparatus that selectively ejects multiple types of liquid onto a print medium from a head that moves back and forth in the main scanning direction, darkness unevenness caused by the order in which the liquids are superimposed upon the print medium, without increasing the size of the head unit and the number of constituent components.

A liquid ejecting apparatus according to a first aspect of the invention is a liquid ejecting apparatus that ejects liquids of different types toward a print medium from multiple rows of nozzles each time the print medium is fed in a sub scanning direction, while moving, in a main scanning direction, a head unit in which the multiple nozzle rows, each of which includes multiple nozzles arranged along the sub scanning direction, are disposed in the main scanning direction, the apparatus including: a storage unit in which is stored a first mask pattern that changes the number of times the liquid is ejected from the nozzles included in the nozzle rows in stages based on the distance of the nozzles from a reference nozzle and a second mask pattern that changes the number of times the liquid is ejected from the nozzles included in the nozzle rows in stages different from the change of the first mask pattern; and a control unit that, during bidirectional printing performed by the head unit, controls, based on a mask pattern selected from the first and second mask patterns in accordance with the type of the liquid, the number of times the liquid is ejected from the nozzles in each nozzle row in an outbound pass and an inbound pass of the head unit, while feeding the print medium in the sub scanning direction by a feed amount that is shorter than the length of the nozzle rows.

According to this aspect of the invention, darkness unevenness caused by the order in which the liquids are superimposed upon the print medium can be suppressed without changing the configuration of the head (that is, without increasing the size of the head unit and the number of constituent components), as mentioned earlier.

For example, in the case where inks having different coloring material densities or inks of a color that has different brightnesses are used as the multiple liquids, it is preferable that the control unit use the first mask pattern or the second mask pattern in accordance with the coloring material density of the ink or the degree of brightness of the ink. This makes it possible to form a high-quality image that has little darkness unevenness at a high speed.

According to another aspect of the invention, in the case where inks having different coloring material densities or inks of a color that has different brightnesses are used as the multiple liquids, it is preferable that the control unit use the first mask pattern or the second mask pattern in accordance with the coloring material density of the ink or the degree of brightness of the ink.

This makes it possible to suppress darkness unevenness caused by the order in which inks of different brightnesses are superimposed upon the print medium.

According to another aspect of the invention, it is preferable that the first mask pattern be set so that the number of times the ink is ejected from each of the nozzles that configure the nozzle row increases the farther a nozzle is from the reference nozzle and the closer the nozzle is toward the end of the nozzle row, and the second mask pattern be set so that the number of times the ink is ejected from each of the nozzles that configure the nozzle row decreases the farther a nozzle is from the reference nozzle and the closer the nozzle is toward the end of the nozzle row.

BRIEF DESCRIPTION OF THE DRAWINGS

The invention will be described with reference to the accompanying drawings, wherein like numbers reference like elements.

FIG. 1A is a diagram illustrating the overall configuration of an ink jet printer according to an embodiment of the invention, whereas

FIG. 2A is a conceptual diagram illustrating a first mask pattern according to an embodiment of the invention, whereas FIG. 2B is a conceptual diagram illustrating a second mask pattern according to an embodiment of the invention.

FIG. 4A is a dot pattern diagram of a normal mixed-color image formed with the ink duty in all of the nozzles of the recording head at 100%, whereas

DESCRIPTION OF EXEMPLARY EMBODIMENTS

An embodiment of the invention will be described hereinafter with reference to the appended drawings.

First, the configuration of a liquid ejecting apparatus according to the embodiment will be described. Here, an ink jet printer will be given as an example of the liquid ejecting apparatus.

Figure 1A:
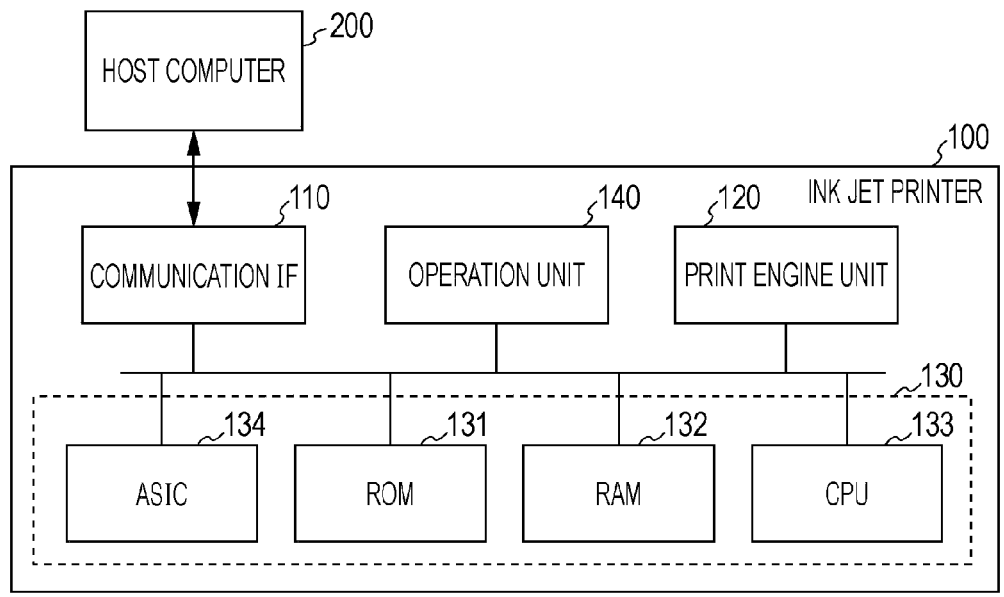
Figure 1B:
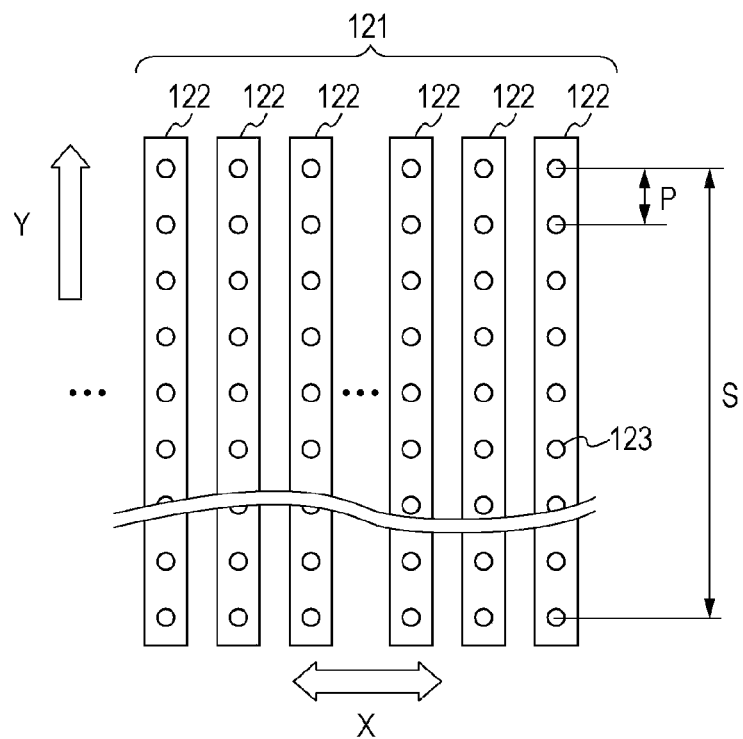
FIG. 1B is a diagram illustrating an example of the disposition of recording heads and the arrangement of nozzles in each of the recording heads.

FIG. 1A is a diagram illustrating the overall configuration of an ink jet printer according to this embodiment, whereas FIG. 1B is a diagram illustrating an example of the disposition of recording heads in a recording head unit and the arrangement of nozzles in each of the recording heads.

As illustrated in FIG. 1A, an ink jet printer 100 according to this embodiment includes: a communication interface (IF) 110 that exchanges data with a host computer 200; an operation unit 140 that receives operations such as print mode settings (bidirectional printing or the like) and so on from a user; a print engine unit 120 that records, onto a print medium, an image expressed by print data from the host computer 200; a control unit 130 that controls the ink jet printer 100 as a whole; a bus that connects these elements to each other; and so on. Note that any material may be used for the print medium used here as long as it is a material on which an ink pattern can be formed (recording paper, cloth, resin, metal, glass, ceramics, wood, hide, and so on).

Here, the print engine unit 120 includes an ink jet printing mechanism for ejecting ink from recording heads onto the print medium while moving the recording heads and the print medium relative to each other. Specifically, the print engine unit 120 includes a recording head unit 121, a head movement mechanism that moves the recording head unit 121 back and forth in the main scanning direction X, a print medium transport mechanism that transports the print medium in the direction Y orthogonal to the main scanning direction X (that is, the sub scanning direction) by a predetermined feed amount L, and so on.

The recording head unit 121 includes multiple recording heads 122, each of which has a scanning width S, disposed in a row in the main scanning direction X. Each of the recording heads 122 includes a nozzle plate in which multiple nozzles 123, which face toward the transport path side of the print medium, are formed at a predetermined pitch p along the sub scanning direction Y; ink from ink cartridges mounted in correspondence with the recording heads 122 is ejected toward the print medium from the nozzles 123 in the recording heads 122. Note that in this embodiment, in addition to ink cartridges containing color ink such as yellow, cyan, and magenta and an ink cartridge containing black ink, ink cartridges containing inks having a lower coloring material density than the stated inks (for example, light cyan, light magenta, light black, and so on) are also used as the ink cartridges installed in correspondence with the recording heads 122.

The control unit 130 includes: a ROM 131 in which are stored various types of programs such as print control programs, various types of data such as the two types of decimating mask patterns, and so on; a RAM 132; a CPU 133 that controls the operations of the ink jet printer 100 by executing the print control program or the like that has been loaded into the RAM 132 from the ROM 131; an ASIC 134 that carries out image processes (ink color space conversion processes, binarization processes, mask processes using decimating mask patterns, and so on) on print data from the host computer 200 and controls the print engine unit 120 in accordance with the print data that has undergone the image processing; and so on. Through this configuration, the control unit 130 expands the print data from the host computer 200 in an image buffer, and based on a dot arrangement pattern determined by the logical product of binary data for each color component obtained by the print data and a corresponding mask pattern, controls the ejection of the ink from the nozzles 123 in the recording heads 122.

Next, descriptions will be given regarding the two types of decimating mask patterns used in order to obtain dot arrangement patterns for each color and overlap printing that uses these decimating mask patterns. Here, in order to simplify the descriptions, an application example will be given in which printing of a region having a width that corresponds to the feed amount of the print medium (that is, a band) is completed through eight scan passes using a recording head having 16 nozzles.

FIGS. 2A and 2B are conceptual diagrams illustrating two types of mask patterns 300 and 310 according to this embodiment. In FIGS. 2A and 2B, blocks containing black circles or white circles indicate regions in which dots are formed in a single scan pass, whereas blocks containing x symbols indicate regions from which dots have been removed through decimation in the single scan pass.

The one decimating mask pattern 300 (a first mask pattern) is set, as shown in FIG. 2A, so that the ink duty (that is, the ratio of the number of post-decimation dots to the maximum number of dots that can be formed) of each of the nozzles 123 that configure a nozzle row gradually decreases from a nozzle $123N_1$ at one end to a nozzle $123N_8$ at the center and gradually increases from the nozzle $123N_8$ at the center to a nozzle $123N_{16}$ at the other end. In this embodiment, the ink duty of the nozzle $123N_8$ at the center is set to 0% (that is, there are zero ink ejections), and the ink duties of the nozzles are increased at a predetermined rate from the nozzle $123N_8$ at the center to the nozzles $123N_1$ and $123N_{16}$ on either side so that the ink duty of the nozzle $123N_{16}$ at the other side is 100% (that is, the number of ink ejections corresponds to the maximum capacity of the nozzle). Accordingly, by using this first mask pattern 300, the gradation ratio (that is, the ratio of the gradations in the post-decimation color tone to the gradations of the non-decimated color) of the ink in a band-shaped image pattern of the scanning width S changes in the direction of the scanning width S so that the color of the band-shaped image pattern of the scanning width S formed through a single pass gradually darkens from the central raster to the rasters on either side.

Meanwhile, the other decimating mask pattern 310 (a second mask pattern) is set so that, as shown in FIG. 2B, the ink duty of each of the nozzles 123 that configure a nozzle row gradually increases from the nozzle $123N_1$ at one end to the nozzle $123N_8$ at the center and gradually decreases from the nozzle $123N_8$ at the center to the nozzle $123N_{16}$ at the other end. In this embodiment, the ink duty of the nozzle $123N_8$ at the center is set to 100%, and the ink duties of the nozzles are reduced at a predetermined rate from the nozzle $123N_8$ at the center to the nozzles $123N_1$ and $123N_{16}$ on either side so that the ink duty of the nozzle $123N_{16}$ at the other end is 0%. Accordingly, by using this second mask pattern 310, the gradation ratio of the ink in a band-shaped image pattern of the scanning width S changes in the direction of the scanning width S so that the color tone of the band-shaped image pattern of the scanning width S formed through a single pass gradually lightens from the central raster to the rasters on either side.

Note that the first and second mask patterns 300 and 310 may be any patterns that make it possible to control the number of ink ejections of the nozzles 123 so that the ink duties of the nozzles 123 that configure the nozzle rows increase and decrease as described above, and it is not necessary for the dot arrangement patterns formed as a result of the application of the first and second mask patterns 300 and 310 to be as illustrated in FIGS. 2A and 2B. In actuality, the positions of the regions in which the dots are formed may, for example, be skewed in the main scanning direction X within the dot repetition patterns that are on the scanning lines of the nozzles $123N_1$ to $123N_{16}$ (in FIGS. 2A and 2B, each of the lines in the main scanning direction X in the mask patterns) so that the dots are dispersed throughout the scanning lines of the nozzles $123N_1$ to $123N_{16}$.

In this embodiment, when printing a mixed-color image that contains the color components of inks having coloring materials of different densities (that is, inks having different darknesses) through bidirectional printing, the print medium is fed by the predetermined feed amount L, which corresponds to ⅛ of the scanning width S of the recording heads 122, while controlling the number of times ink having a low coloring material density (called "light ink" hereinafter) and ink having a high coloring material density (called "dark ink" hereinafter) are ejected using the two types of decimating mask patterns 300 and 310. As a result, so-called overlap printing, in which a new ink pattern is formed partially overlapping with an ink pattern that has already been formed, is executed.

Figure 3:
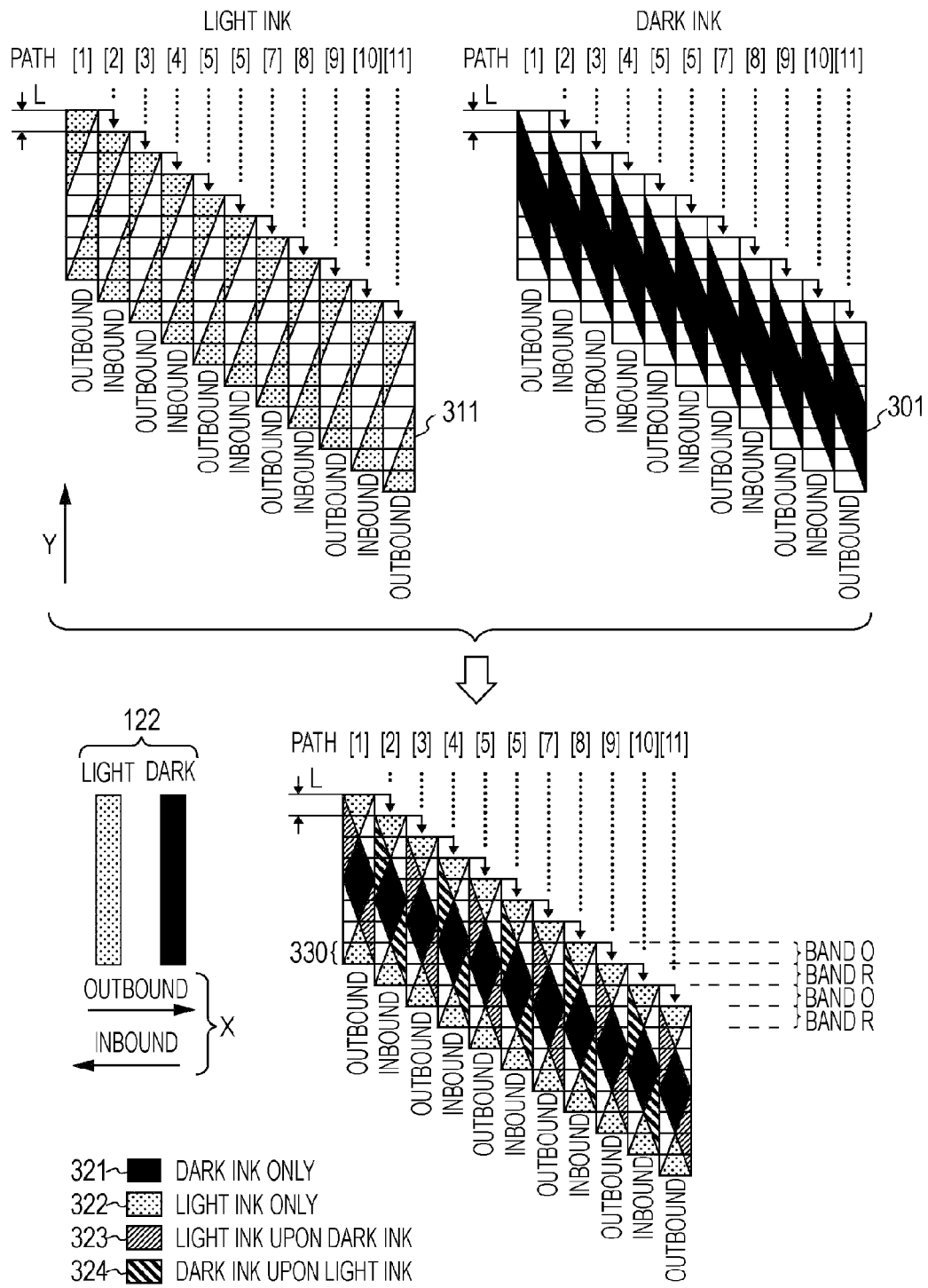
FIG. 3 is a diagram illustrating the transition of ink patterns formed by first and second mask patterns according to an embodiment of the invention.

FIG. 3 illustrates the transition state of ink patterns formed in each scanning pass in the case where a mixed-color image having dark ink and light ink is printed through bidirectional printing. FIG. 3 illustrates a case in which the first mask pattern 300 is applied in controlling the number of times ink is ejected from the nozzles 123 of a light ink recording head 122 and the second mask pattern 310 is applied in controlling the number of times ink is ejected from the nozzles 123 of a dark ink recording head 122.

In the case where the dark ink recording head 122 is disposed in a position that is closer to the transport path of the print medium than the light ink recording head 122 when the recording head unit 121 is at the home position, in each outbound pass (that is, the odd-numbered passes, or 1, 3, 5 and so on), the dark ink recording head 122 repeatedly forms a dark ink pattern 301 along the main scanning direction X, after which the following light ink recording head 122 repeatedly forms a light ink pattern 311, in which the dot arrangement pattern differs from that of the dark ink pattern 301, along the main scanning direction X. On the other hand, as opposed to the outbound passes, in each inbound pass (that is, the even-numbered passes, or 2, 4, 6, and so on), the light ink recording head 122 repeatedly forms the light ink pattern 311 along the main scanning direction X, after which the following dark ink recording head 122 repeatedly forms the dark ink pattern 301 along the main scanning direction X.

Accordingly, a scan area of one outbound pass includes a dot group 323 in which light ink has been overprinted on dark ink, as well as a dot group 322 in which only light ink has been printed and a dot group 321 in which only dark ink has been printed; meanwhile, a scan area of one inbound pass includes a dot group 324 in which dark ink has been overprinted on light ink, as well as the dot group 322 in which only light ink has been printed and the dot group 321 in which only dark ink has been printed. The distribution of the dot groups 322 in which only light ink has been printed and the distribution of the dot groups 321 in which only dark ink has been printed throughout multiple block regions 330 of which a band of a width corresponding to the feed amount L of the print medium is configured (in FIG. 3, eight sequential passes' worth of block regions 330) transits in the same manner regardless of whether printing is started in a band O from the outbound direction or is started in a band R from the inbound direction. Accordingly, it is thought that differences in surface area occupation rates of dots whose ink superimposing order is different between adjacent bands will be suppressed, thus reducing darkness unevenness between bands caused by the order in which inks are superimposed on the print medium.

Meanwhile, in each outbound pass, dots in which light ink has been overprinted on dark ink, dots in which only dark ink has been printed, and dots in which only light ink has been printed are intermixed in the scanning lines of each nozzle 123, whereas in each inbound pass, dots in which dark ink has been overprinted on light ink, dots in which only light ink has been printed, and dots in which only dark ink has been printed are intermixed in the scanning lines of each nozzle 123. Accordingly, variations arise in the order in which inks are superimposed in the dots that configure each raster of the mixed-color image formed through bidirectional printing. It is thought that this, too, will reduce darkness unevenness caused by the order in which inks are superimposed on the print medium.

In order to confirm the above effects, three bands' worth of regions are extracted from a mixed-color image formed with the ink duty of all the nozzles in the recording heads 122 for both dark ink and light ink at 100% (that is, a mixed-color image formed without using the first and second mask patterns 300 and 310) and a mixed-color image formed using the first and second mask patterns 300 and 310, and the respective three bands' worth of regions are compared to each other.

Figure 4A:
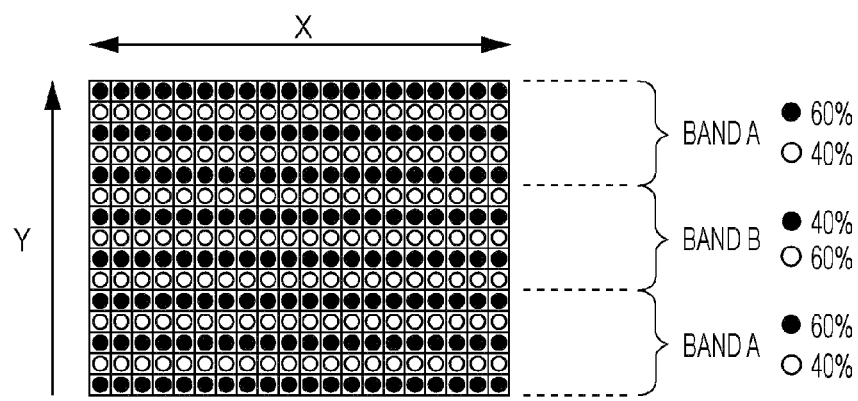
Figure 4B:
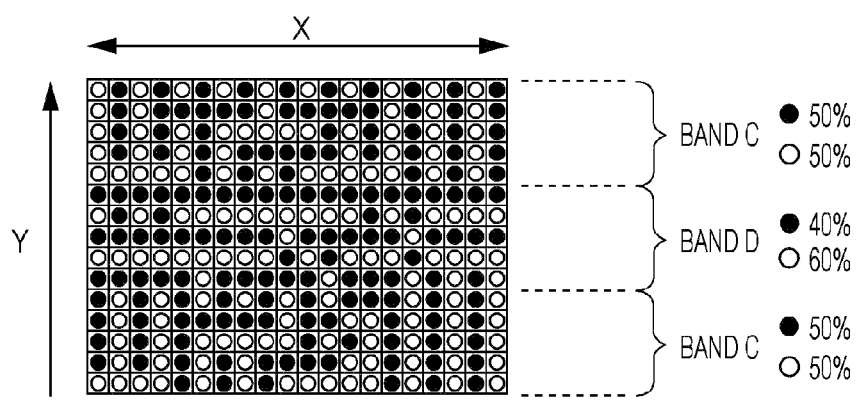
FIG. 4B is a dot pattern diagram of a mixed-color image formed using two types of mask patterns according to an embodiment of the invention.

FIG. 4A illustrates a dot pattern in a region that has been cut out from a mixed-color image formed without using the first and second mask patterns 300 and 310, whereas FIG. 4B illustrates a dot pattern in a region that has been cut out from a mixed-color image formed using the first and second mask patterns 300 and 310.

Three bands' worth of regions have been extracted from a mixed-color image formed with the ink duty of all the nozzles in the recording heads 122 for both dark ink and light ink at 100% (that is, a mixed-color image formed without using the first and second mask patterns 300 and 310) and a mixed-color image formed using the first and second mask patterns 300 and 310, and the dot patterns therein are indicated in FIGS. 4A and 4B, respectively.

In the mixed-color image formed without using the first and second mask patterns 300 and 310 (FIG. 4A), a band A, in which the surface area occupation rate of dots formed by overprinting dark ink upon light ink (black circles) is 60% and the surface area occupation rate of dots formed by overprinting light ink upon dark ink (white circles) is 40%, and a band B, in which the surface area occupation rate of dots formed by overprinting dark ink upon light ink is 40% and the surface area occupation rate of dots formed by overprinting light ink upon dark ink is 60%, appear alternately.

As opposed to this, in the mixed-color image formed using the first and second mask patterns 300 and 310 (FIG. 4B), a band C, in which the surface area occupation rate of dots formed by overprinting dark ink upon light ink (black circles) is 50% and the surface area occupation rate of dots formed by overprinting light ink upon dark ink (white circles) is 50%, and a band D, in which the surface area occupation rate of dots formed by overprinting dark ink upon light ink is 40% and the surface area occupation rate of dots formed by overprinting light ink upon dark ink is 60%, appear alternately.

When the two are compared, it can be seen that differences in the surface area occupation rates of dots whose ink superimposing order is different between adjacent bands are suppressed in the mixed-color image formed using the first and second mask patterns 300 and 310. Accordingly, it can be seen that the occurrence of darkness unevenness is suppressed by using the first and second mask patterns 300 and 310.

Furthermore, in the mixed-color image formed without using the first and second mask patterns 300 and 310 (FIG. 4A), rows of dots formed by overprinting light ink upon dark ink (rows of multiple white dots that follow the main scanning direction X) and rows of dots formed by overprinting dark ink upon light ink (rows of multiple black dots that follow the main scanning direction X) are arranged alternately in the sub scanning direction Y. With these dot rows, there is the possibility that lines of different color tones can be recognized.

As opposed to this, in the mixed-color image formed using the first and second mask patterns 300 and 310 (FIG. 4B), the dots formed by overprinting light ink upon dark ink (white circles) and the dots formed by overprinting dark ink upon light ink (black circles) are dispersed throughout both the main scanning direction X and the sub scanning direction Y. Accordingly, it is difficult to identify differences in the color tones between the dots formed by overprinting light ink upon dark ink and the dots formed by overprinting dark ink upon light ink, and thus the overall image is recognized as a single color tone.

In this manner, using two types of mask patterns having different distributions of gradation ratios depending on the darkness of the ink makes it possible to vary the superimposing order of the ink of the dots among rasters. Accordingly, it is possible to suppress darkness unevenness caused by the order in which ink is superimposed upon the print medium without increasing the size of the recording head unit and the number of constituent components.

Meanwhile, as shown in FIG. 4A, in a mixed-color image formed without using the first and second mask patterns 300 and 310, rows of dots formed by overprinting light ink upon dark ink (rows of multiple white dots that follow the main scanning direction X) and rows of dots formed by overprinting dark ink upon light ink (rows of multiple black dots that follow the main scanning direction X) are arranged alternately in the sub scanning direction Y. Accordingly, lines of different color tones are recognized.

As opposed to this, in a mixed-color image formed using the first and second mask patterns 300 and 310 (FIG. 4B), the dots formed by overprinting light ink upon dark ink and the dots formed by overprinting dark ink upon light ink are dispersed throughout both the main scanning direction X and the sub scanning direction Y. Accordingly, it is difficult to identify differences in the color tones between the dots formed by overprinting light ink upon dark ink and the dots formed by overprinting dark ink upon light ink, and thus the overall image is recognized as a single color tone.

In this manner, using two types of mask patterns having different distributions of gradation ratios depending on the darkness of the ink makes it possible to suppress differences in the occupation rates of dots having different ink superimposing orders, and makes it possible to vary the superimposing order of the ink of the dots among rasters. Accordingly, it is possible to suppress darkness unevenness caused by the order in which inks are superimposed upon the print medium and print a high-quality image at a speed that is faster than that obtained when using unidirectional printing, even without employing a step-shaped support platform such as that used in past ink jet printers as described in the aforementioned related art section (in other words, without increasing the size of the recording head unit and the number of constituent components).

Although two types of decimating mask patterns 300 and 310 having different distributions of ink gradation ratios are applied to inks having different darknesses in this embodiment, it should be noted that these decimating mask patterns 300 and 310 may be applied to other combinations of inks. For example, in the case where a mixed-color image containing color components of inks having different brightnesses is formed, one of the two types of decimating mask patterns 300 and 310 may be applied to an ink having a high brightness, whereas the other of the two types of decimating mask patterns 300 and 310 may be applied to an ink having a low brightness. Meanwhile, in the case where a mixed-color image containing color components of inks that have the same hue is formed, the two types of decimating mask patterns 300 and 310 may be used in accordance with the darkness of the ink, whereas in the case where a mixed-color image containing inks having different hues is formed, the two types of decimating mask patterns 300 and 310 may be used in accordance with the brightnesses of the inks.

Although an ink jet printer has in the foregoing been given as an example of a liquid ejecting apparatus that selectively ejects multiple types of liquid onto a print medium from a head that moves back and forth in the main scanning direction, the configuration of the liquid ejecting apparatus according to the invention can also be applied in other apparatuses that employ ink jet techniques for ejecting multiple types of material in liquid form from nozzles onto target positions. For example, the invention can be applied not only in image recording apparatuses such as facsimile machines and copy machines, but also in color jet apparatuses that can selectively apply coloring materials for the color filters of liquid crystal displays, alignment layer deposition apparatuses used in the manufacturing processes of liquid crystal panels, organic material application apparatuses used in the manufacturing process of organic EL displays, apparatuses that alternately pattern and layer inks in which metal particles such as silver are dispersed and insulating inks (flexible multilayer wiring boards), apparatuses that form silicon film patterns in the manufacturing process of silicon thin-film transistors, deposition apparatuses that form organic thin-films for organic thin-film transistors, apparatuses that form ink jet microlenses by ejecting UV-curable resins, liquid ejecting apparatuses that eject liquids containing bioorganic matter used in the manufacture of biochips, ejecting apparatuses that eject test materials for use in precision pipettes, and so on.

According to the invention, by selectively using a different mask pattern for each different type of liquid from among multiple types of mask patterns to determine the number of times the liquid is ejected from the nozzles within a nozzle row, differences, between bands, in the occupation rates of dots whose liquid superimposing orders are different can be suppressed, and the liquid superimposing order of dots that configure rasters can be varied. Accordingly, it is possible to suppress darkness unevenness caused by the order in which the liquid is superimposed upon the print medium without increasing the size of the recording head unit and the number of constituent components.

The entire disclosure of Japanese Patent Application No. 2010-057128, filed Mar. 15, 2010 is expressly incorporated by reference herein.

What is claimed is:

1. A liquid ejecting apparatus comprising:
   a head unit that moves in the main scanning direction and in which multiple nozzle rows are arranged in the main scanning direction, each nozzle row including multiple nozzles arranged along the sub scanning direction, which is the direction in which a print medium is transported, and the head unit ejecting liquids whose types differ for each of the nozzle rows from the nozzles toward the print medium; and
   a control unit that executes bidirectional printing by controlling, based on a mask pattern, the number of times the liquid is ejected from the nozzles in each nozzle row in an outbound pass and an inbound pass of the movement of the head unit in the main scanning direction,
   wherein in the bidirectional printing, ejection of the liquid from the nozzles in each of the nozzle rows in the outbound pass and the inbound pass and feeding of the print medium in the sub scanning direction by a feed amount that is shorter than the length of the nozzle rows are repeatedly carried out;
   the mask pattern is set to either a first mask pattern or a second mask pattern based on the type of the liquid;
   the first mask pattern changes the number of times the liquid is ejected from the nozzles included in the nozzle rows in stages based on the distance of the nozzles from a reference nozzle; and
   the second mask pattern changes the number of times the liquid is ejected from the nozzles included in the nozzle rows in stages different from the change of the first mask pattern.

2. The liquid ejecting apparatus according to claim 1, wherein in the case where inks having different coloring material densities and inks of a color that has different brightnesses are used as the multiple liquids, the control unit uses the first mask pattern or the second mask pattern in accordance with the coloring material density of the ink or the degree of brightness of the ink.

3. The liquid ejecting apparatus according to claim 1, wherein the first mask pattern is set so that the number of times the ink is ejected from each of the nozzles that configure the nozzle row increases the farther a nozzle is from the reference nozzle and the closer the nozzle is toward the end of the nozzle row, and the second mask pattern is set so that the number of times the ink is ejected from each of the nozzles that configure the nozzle row decreases the farther a nozzle is from the reference nozzle and the closer the nozzle is toward the end of the nozzle row.

4. The liquid ejecting apparatus according to claim 1, wherein the reference nozzle in the first mask pattern does not eject the liquid, and the reference nozzle in the second mask pattern ejects an amount of the liquid corresponding to a maximum capacity of the reference nozzle.

5. The liquid ejecting apparatus according to claim 1, wherein the reference nozzle is located between a nozzle at one terminal end of the nozzle row and a nozzle at the other terminal end of the nozzle row.

6. The liquid ejecting apparatus according to claim 1, wherein the first mask pattern changes the number of times at a first predetermined rate of change that is based on the distance of the nozzles from the reference nozzle, and the second mask pattern changes the number of times at a second predetermined rate of change that is based on the distance of the nozzles from the reference nozzle.

7. A liquid ejecting method performed by a liquid ejecting apparatus including a head unit that moves in the main scanning direction and in which multiple nozzle rows are arranged in the main scanning direction, each nozzle row having multiple nozzles arranged along the sub scanning direction, which is the direction in which a print medium is transported, the head unit ejecting liquids whose types differ for each of the nozzle rows toward the print medium, and the method comprising:
   controlling, based on a mask pattern, the number of times the liquid is ejected from the nozzles in each nozzle row in an outbound pass and an inbound pass of the movement of the head unit in the main scanning direction;
   performing bidirectional printing in which ejection of the liquid from the nozzles in each of the nozzle rows in the outbound pass and the inbound pass and feeding of the print medium in the sub scanning direction by a feed amount that is shorter than the length of the nozzle rows are repeatedly carried out;
   setting the mask pattern to either a first mask pattern or a second mask pattern based on the type of the liquid;
   the first mask pattern changing the number of times the liquid is ejected from the nozzles included in the nozzle rows in stages based on the distance of the nozzles from a reference nozzle; and
   the second mask pattern changing the number of times the liquid is ejected from the nozzles included in the nozzle rows in stages different from the change of the first mask pattern.

* * * * *